(12) United States Patent
Davis et al.

(10) Patent No.: US 9,862,038 B2
(45) Date of Patent: Jan. 9, 2018

(54) ROTARY CUTTING TOOL WITH UNEQUAL INDEXING, ALTERNATING HELIX ANGLE AND VARYING HELIX ANGLE ALONG LENGTH OF CUT

(71) Applicant: Kennametal Inc., Latrobe, PA (US)

(72) Inventors: Danny Ray Davis, Asheboro, NC (US); Frederick John Palmer, Studley (GB)

(73) Assignee: KENNAMETAL INC., Latrobe, PA (US)

( * ) Notice: Subject to any disclaimer, the term of this patent is extended or adjusted under 35 U.S.C. 154(b) by 185 days.

(21) Appl. No.: 14/683,692

(22) Filed: Apr. 10, 2015

(65) Prior Publication Data

US 2016/0297012 A1 Oct. 13, 2016

(51) Int. Cl.
*B23C 5/10* (2006.01)

(52) U.S. Cl.
CPC ........ *B23C 5/10* (2013.01); *B23C 2210/0492* (2013.01); *B23C 2210/282* (2013.01)

(58) Field of Classification Search
CPC .............. B23C 5/10; B23C 2210/0492; B23C 2210/0485; B23C 2210/282; B23C 2210/285; B23C 2210/287
See application file for complete search history.

(56) References Cited

U.S. PATENT DOCUMENTS

| | | | | |
|---|---|---|---|---|
| 4,963,059 A * | 10/1990 | Hiyama | ................ | B23C 5/003 407/11 |
| 6,991,409 B2 * | 1/2006 | Noland | .................... | B23C 5/10 407/59 |
| 7,001,113 B2 * | 2/2006 | Flynn | ...................... | B23C 5/10 407/54 |
| 7,223,053 B2 * | 5/2007 | Flynn | ...................... | B23C 5/10 407/53 |
| 7,563,059 B2 * | 7/2009 | Song | ........................ | B23C 5/10 407/53 |
| 8,221,036 B2 * | 7/2012 | Volokh | ................... | B23C 5/003 407/54 |
| 8,366,354 B2 * | 2/2013 | Davis | ....................... | B23C 5/10 407/53 |
| 8,690,492 B2 * | 4/2014 | Azegami | .............. | B23C 5/1009 407/53 |
| 9,364,904 B2 * | 6/2016 | Osawa | ..................... | B23C 5/10 |
| 9,630,263 B2 * | 4/2017 | Wells | ........................ | B23C 5/10 |
| 2007/0297864 A1 * | 12/2007 | de Boer | ................... | B23C 5/10 407/54 |

* cited by examiner

Primary Examiner — Will Fridie, Jr.
(74) Attorney, Agent, or Firm — Matthew S. Bedsole

(57) ABSTRACT

A rotary cutting tool with a longitudinal axis includes a shank portion and a cutting portion defining a length of cut. The cutting portion includes a plurality of blades separated by flutes extending along the length of cut. A first blade forms a first helix angle with respect to the longitudinal axis at the cutting tip. A second blade adjacent the first blade forms a second, different helix angle with respect to the longitudinal axis at the cutting tip. The cutting edge of the first blade is formed at a first distance with respect to the cutting edge of the second blade. A helix angle of at least one of the plurality of blades varies along the length of cut and a distance between cutting edges of the first and second blades varies along the length of cut.

19 Claims, 6 Drawing Sheets

ROTARY CUTTING TOOL WITH UNEQUAL INDEXING, ALTERNATING HELIX ANGLE AND VARYING HELIX ANGLE ALONG LENGTH OF CUT

FIELD OF THE INVENTION

The present invention pertains to a rotary cutting tool with a plurality of helical cutting blades. More particularly, the present invention relates to an end mill having helical cutting blades with an unequal index starting at the cutting tip, alternating helix angles at the cutting tip, and a varying helix angle along the length of cut (LOC).

BACKGROUND OF THE INVENTION

Rotary cutting tools, such as end mills, typically have a cylindrical configuration that includes a shank portion and a cutting portion. The cutting portion contains a plurality of helically disposed cutting blades that extend from a first end (i.e., the "shank end") of the cutting portion adjacent the shank portion, toward the opposite end (i.e., the "free end") of the cutting portion. In some embodiments, the cutting edges of the helical teeth or blades are disposed along a substantially constant radius with respect to the longitudinal axis of the tool. In other embodiments, generally referred to as "tapered" cutting tools, the cutting portion is substantially frustoconical in shape; i.e., the cutting edge of each blade has a constantly decreasing or increasing radius with respect to the longitudinal axis of the tool as the cutting edge extends from the shank end of the cutting portion to the free end. The cutting edges of the blades in a tapered rotary cutting tool are at the same radius from the longitudinal axis of the tool in any plane through the cutting portion and perpendicular to the longitudinal axis of the tool. In still other end mill embodiments, generally referred to as "straight-fluted" rotary cutting tools, the cutting edges of the blades extend parallel to the longitudinal axis of the tool.

There are known rotary cutting tools in the art that have unequal indexing. These rotary cutting tools work in any ratio of the length of cut (LOC) to cutting diameter (D) (i.e., L-D ratio) because they have the same constant helix on all flutes. There is also known rotary cutting tools in the art that have unequal indexing and alternating helix angles on every other flute. These cutting tools have an advantage over the cutting tools with only the unequal index due the alternating tangential forces caused by the alternating helix angles. In other words, the alternating helix angles, along with the unequal indexing, helps to further reduce harmonics during a cutting operation.

However, rotary cutting tools with unequal indexing and alternating helix angles are limited by the L-D ratio in which the cutting tool can be produced. More specifically, the L-D ratio is typically limited to a maximum of 2×D simply because the flutes with the alternating helix angles will become closer to each other as the L-D ratio increases. In addition, conventional rotary cutting tools tend to decrease in cutting performance as the flutes become to close to each other, causing a large increase in cutting forces on the following flute where the flutes have become much further apart.

Therefore, it is desirable to provide a rotary cutting tool that overcomes the shortcomings of the prior art.

SUMMARY OF THE INVENTION

The problem of a rotary cutting tool with unequal indexing and alternating helix angles being limited to a maximum L-D ratio is solved by providing a rotary cutting tool that has a varying helix angle along the length of cut (LOC). The varying helix angle can transition in both the positive and negative direction within the same flute, which provides balance to the radial and axial pitch variation between the first flute and subsequent flutes, thereby allowing for all possible L-D ratios, while providing the benefit of alternating tangential forces.

In one aspect of the invention, a rotary cutting tool with a longitudinal axis comprises a shank portion and a cutting portion extending from the shank portion to a cutting tip. The cutting portion has a length of cut, and a plurality of blades separated by flutes extending along the length of cut. Each of the blades includes a cutting edge at an intersection between a leading face and the land surface. A first blade of the plurality of blades forms a first helix angle with respect to the longitudinal axis at the cutting tip, and a second blade of the plurality of blades adjacent the first blade forms a second, different helix angle with respect to the longitudinal axis at the cutting tip. The cutting edge of the first blade is formed at a first distance with respect to the cutting edge of the second blade. The cutting edge of the second blade is formed at a second distance with respect to the cutting edge of a third blade. A helix angle of at least one of the plurality of blades varies along the length of cut.

In another aspect of the invention, a rotary cutting tool with a longitudinal axis comprises a shank portion and a cutting portion extending from the shank portion to a cutting tip. The cutting portion has a length of cut, and a plurality of blades separated by flutes extending along the length of cut. Each of the blades includes a cutting edge at an intersection between a leading face and the land surface. A first blade of the plurality of blades forms a first helix angle with respect to the longitudinal axis at the cutting tip, and a second blade of the plurality of blades adjacent the first blade forms a second, different helix angle with respect to the longitudinal axis at the cutting tip. The cutting edge of the first blade is formed at a first distance with respect to the cutting edge of the second blade at the cutting tip. The cutting edge of the second blade is formed at a second distance with respect to the cutting edge of a third blade at the cutting tip. The cutting edge of the first blade is formed at the second distance with respect to the cutting edge of the second blade at a location between the cutting tip and the cutting portion proximate the shank.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
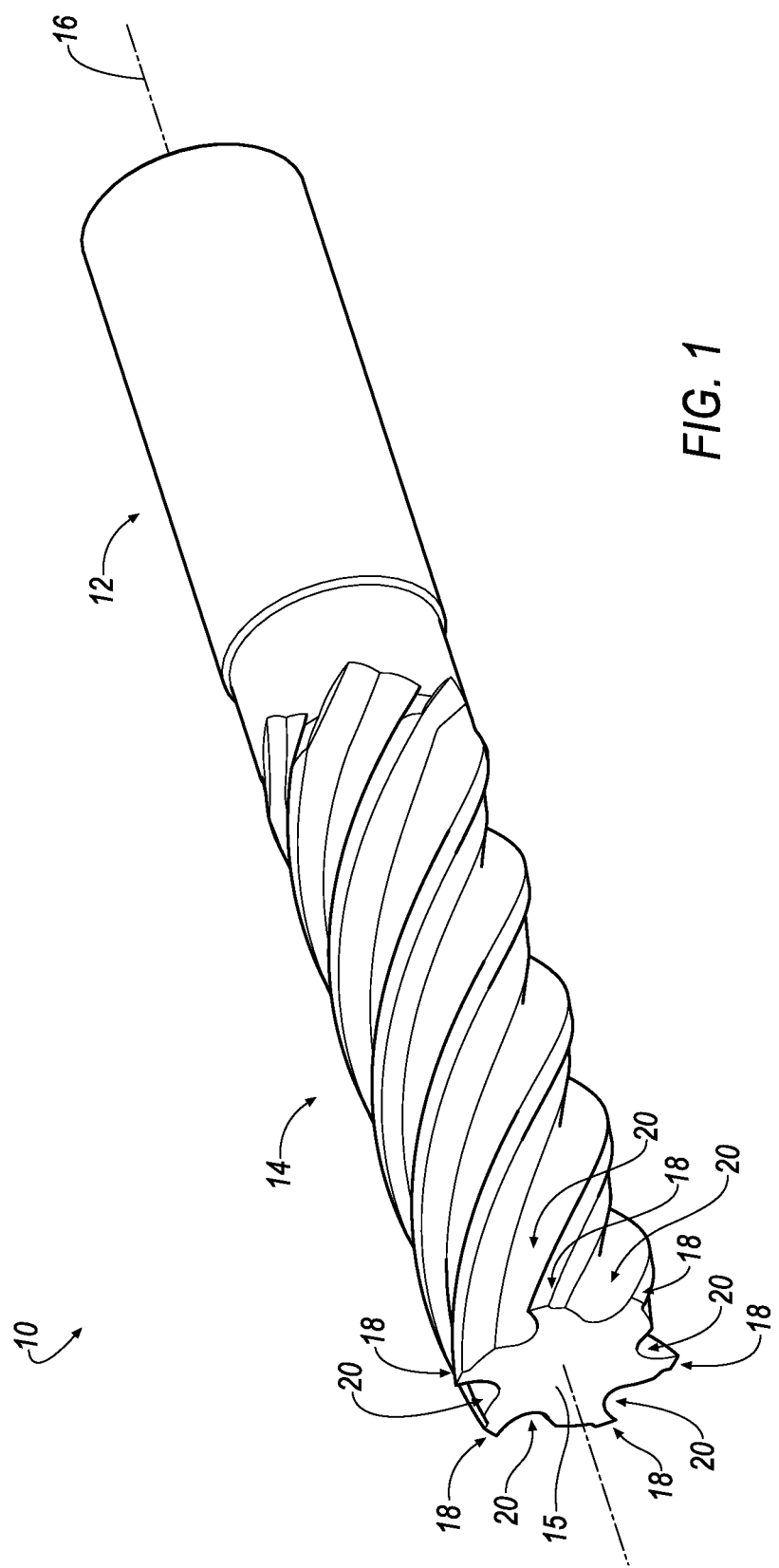
FIG. 1 is a perspective view of a rotary cutting tool with unequal indexing, alternating helix angles, and a varying helix angle along the length of cut (LOC) in accordance with an embodiment of the invention.
Figure 2:
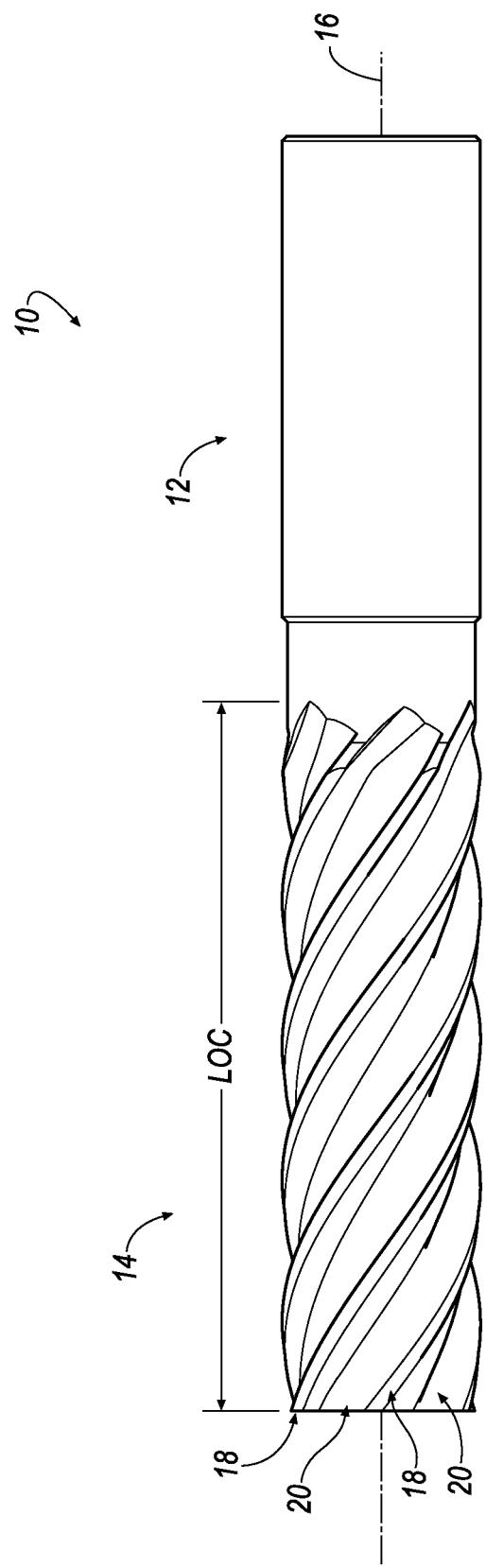
FIG. 2 is a side end view of the rotary cutting tool of FIG. 1.
Figure 3:
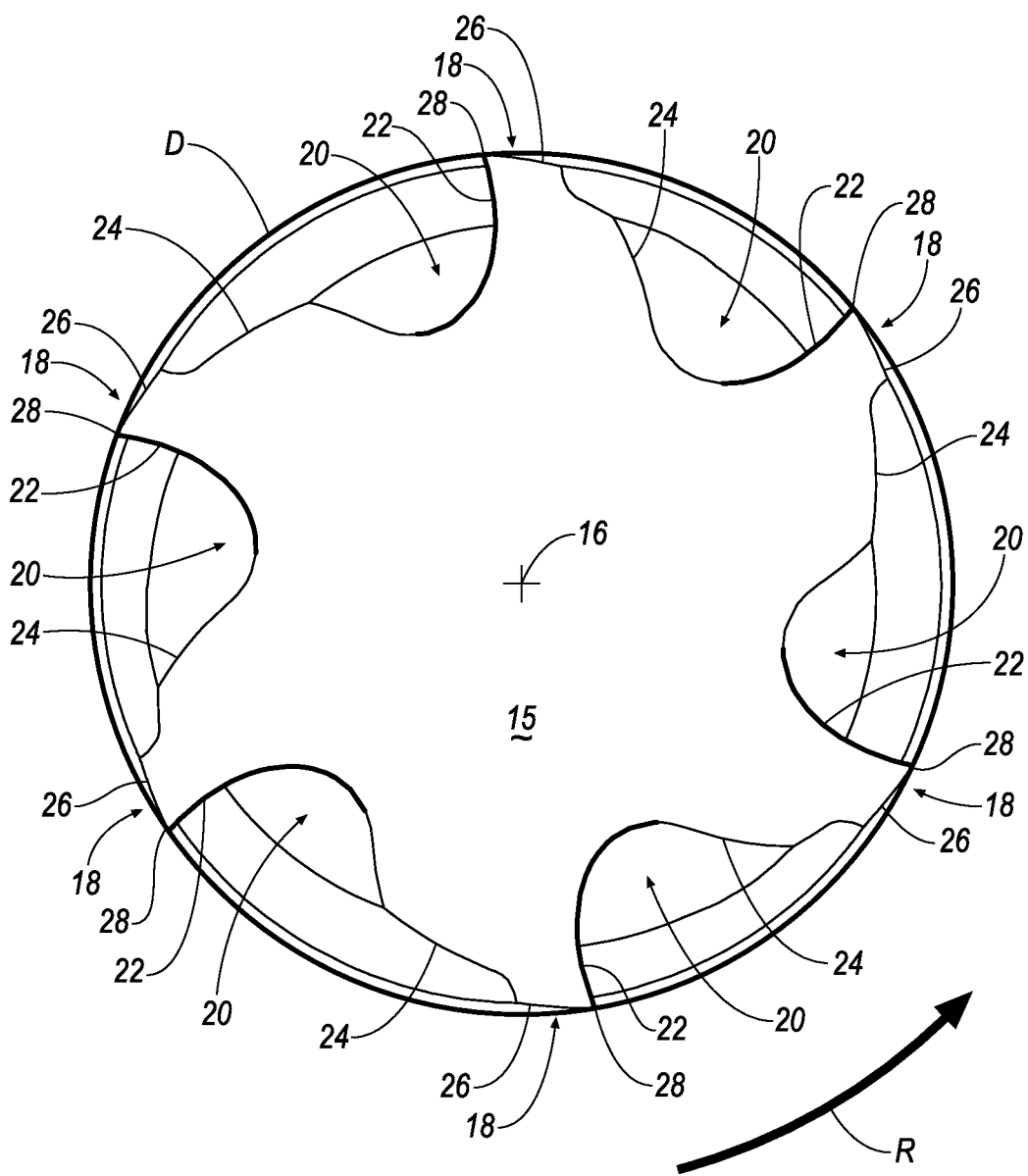
FIG. 3 is an enlarged end view of the rotary cutting tool of FIG. 1.

Referring now to FIGS. 1-3, a rotary cutting tool 10 includes a shank portion 12, a cutting portion 14 extending from the shank portion 12 to a cutting tip 15 along a length of cut (LOC), and a longitudinal axis 16. In the illustrated embodiment, the rotary cutting tool 10 comprises an end mill having a cutting diameter, D. The overall shape of the cutting portion 14 of the cutting tool 10 may be, but is not limited to, a cylindrical shape, a frustoconical shape, and the like. The cutting portion 14 includes a plurality of blades 18 separated by flutes 20 extending the length of the cutting portion 14. The end mill 10 rotates in a direction of the arrow, R. In the illustrated embodiment, the rotary cutting tool 10 has a total of six (6) blades 18 and flutes 20. However, it will be appreciated that the invention is not limited by the number of blades and flutes, and that the invention can be practiced with a fewer or a greater number of blades and flutes. For example, the invention can be practiced with four (4) blades 18 and flutes 20, five (5) blades 18 and flutes 20, seven (7) blades 18 and flutes 20, eight (8) blades 18 and flutes 20, and the like.

Referring now to FIG. 3, each of the blades 18 has a leading face 22, a trailing face 24, and a land surface 26 also bridging the leading face 22 and trailing face 24. The intersection between the leading face 22 and the land surface 26 forms a cutting edge 28 for the respective blade 18.

Figure 4:
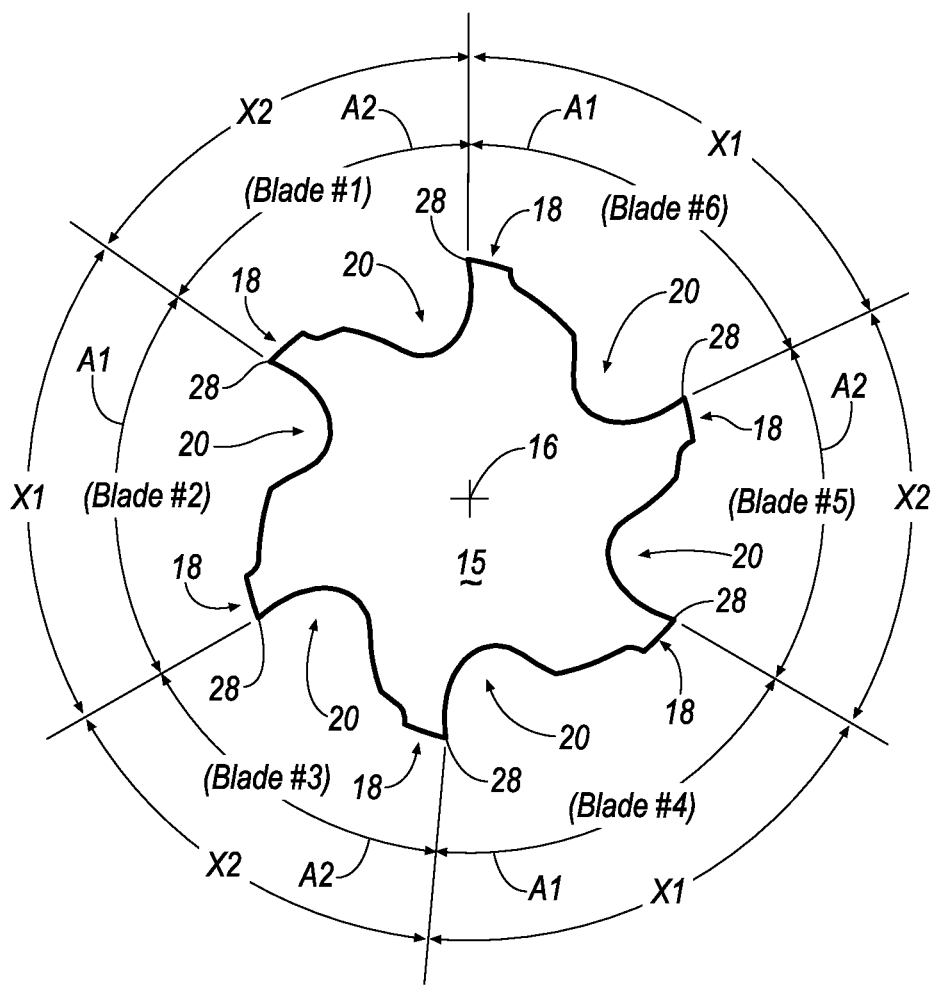
FIG. 4 is another enlarged end view of the rotary cutting tool of FIG. 1 showing the unequal indexing.

Referring now to FIG. 4, the blades 18 have unequal, alternating angular spacing A1, A2 between adjacent blades 18 at the cutting tip 15. In the illustrated embodiment, for example, the angular spacing between blade #6 and blade #5 is A1 degrees, while the angular spacing between blade #5 and blade #4 is A2 degrees. In the illustrated embodiment, the angular spacing A1, A2 alternates between adjacent blades 18, so the angular spacing between blade #4 and blade #3 is A1 degrees, the angular spacing between blade #3 and blade #2 is A2 degrees, the angular spacing between blade #2 and blade #1 is A1 degrees, and the angular spacing between blade #1 and blade #6 is A2 degrees. However, it will be appreciated that the invention is not limited to the angular spacing being alternating, and that the invention can be practiced with the angular spacing being asymmetrical, i.e., the angular spacing being different between adjacent blades, but not alternating.

Similar to the unequal, alternating angular spacing A1, A1 between adjacent blades 18, the distance X1, X2 between adjacent blades 18 is also unequal and alternating (i.e. unequal indexing). In the illustrated embodiment, for example, the distance between blade #6 and blade #5 is equal to X1, while the distance between blade #5 and blade #4 is equal to X2. The distance X1, X2 between adjacent blades 18 alternates in a similar fashion as the angular spacing A1, A2 described above. Thus, the distance between blade #4 and blade #3 is equal to X1, the distance between blade #3 and blade #2 is equal to X2, the distance between blade #2 and blade #1 is equal to X1, and the distance between blade #1 and blade #6 is equal to X2.

Figure 5:
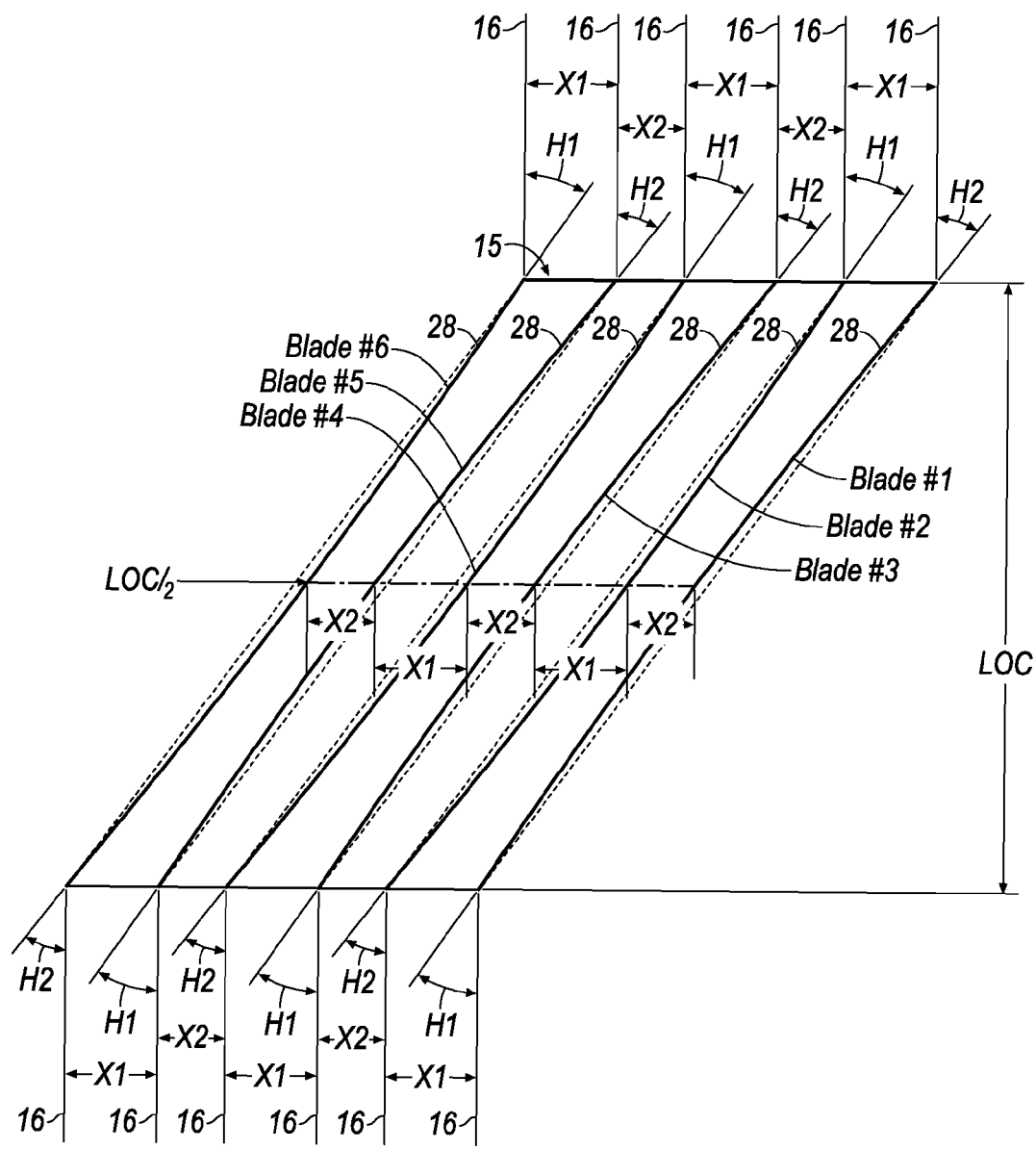
FIG. 5 is a schematic view of a six-fluted rotary cutting tool with alternating helix angles and varying helix angles along the length of cut (LOC) according to an embodiment of the invention.

Referring now to FIG. 5, another aspect of the invention is that the blades 18 have unequally, alternating helix angles with respect to the central, longitudinal axis 16 at the cutting tip 15. In other words, the helix angle of blade #6 at the cutting tip 15 is equal to H1, while the helix angle of blade #5 at the cutting tip 15 is equal to H2, which is larger than the helix angle H1. Because the helix angle H1, H2 for adjacent blades 18 alternate, the helix angle of blade #4 at the cutting tip 15 is equal to H1, the helix angle of blade #3 at the cutting tip 15 is equal to H2, the helix angle of blade #2 at the cutting tip 15 is equal to H1, and the helix angle of blade #1 at the cutting tip 15 is equal to H2.

In the illustrated embodiment, the helix angle, H1, is smaller than the helix angle, H2. However, it will be appreciated that the invention is not limited by the relative magnitude of the helix angles, H1, H2, and that the invention can be practiced with the helix angle, H1, being larger than the helix angle, H2, so long as the helix angles, H1, H2 are unequal and alternating.

Yet another aspect of the invention is that the blades 18 of the cutting tool 10 have a helix angle that varies along the length of cut (LOC) as compared to a constant helix angle (shown as dashed lines in FIG. 5). As shown in FIG. 5, for example, the helix angle of blade #6 varies from a helix angle equal to H1 at the cutting tip 15 to a helix angle equal to H2, which is larger than H1, at the cutting portion 14 proximate the shank 12 (opposite the cutting tip 15). In the illustrated embodiment, the variation of the helix angle is continuous varying along the length of cut (LOC) from the cutting tip 15 to the cutting portion 14 proximate the shank 12. For example, the helix angle of blade #6 at LOC/2 is equal to (H1+H2)/2.

In addition, the distance between adjacent blades 18 also varies along the length of cut (LOC). For example, the distance between the cutting edge 28 of blade #6 and the cutting edge 28 of blade #5 is equal to X1 at the cutting tip 15 and also at the opposite end of the cutting portion 14 proximate the shank 12. However, the distance between the cutting edge 28 of blade #6 and cutting edge 28 of blade #5 is equal to X2, which is smaller than X1, at LOC/2. Similar to the helix angle, the distance between the cutting edges 28 of adjacent blades 18 is continuous varying along the LOC. Thus, the distance, X1, between the cutting edge 28 of blade #6 and the cutting edge 28 of blade #5 continuously becomes smaller along the LOC until LOC/2, then the distance between the cutting edge 28 of blade #6 and the cutting edge 28 of blade #5 continuously becomes larger from LOC/2 along the LOC to a distance X1 at the cutting portion 14 proximate the shank 12.

Oppositely, the distance, X2, at the cutting tip 15 between the cutting edge 28 of blade #5 and the cutting edge 28 of blade #4 continuously becomes larger along the LOC until LOC/2, then the distance between the cutting edge 28 of blade #5 and the cutting edge 28 of blade #4 continuously becomes smaller from LOC/2 along the LOC to a distance X2 at the cutting portion 14 proximate the shank 12. The distance between the cutting edge 28 of blade #4 and the cutting edge 28 of blade #3 and the distance between the cutting edge 28 of blade #2 and the cutting edge 28 of blade #1 behave in an identical manner as the distance between the cutting edge 28 of blade #6 and the cutting edge 28 of blade #5, and the distance between the cutting edge 28 of blade #3 and the cutting edge 28 of blade #2 behaves in an identical manner as the distance between the cutting edge 28 of blade #5 and the cutting edge 28 of blade #4.

As described above, the cutting tool 10 of the invention has a cutting portion 14 with blades 18 with an equal index, alternating helix angle and varying helix angle along the length of cut (LOC). As a result of the varying helix angle along the LOC, the cutting tool 10 of the invention is not limited to the L-D ratio, as compared to conventional cutting tools.

Figure 6:
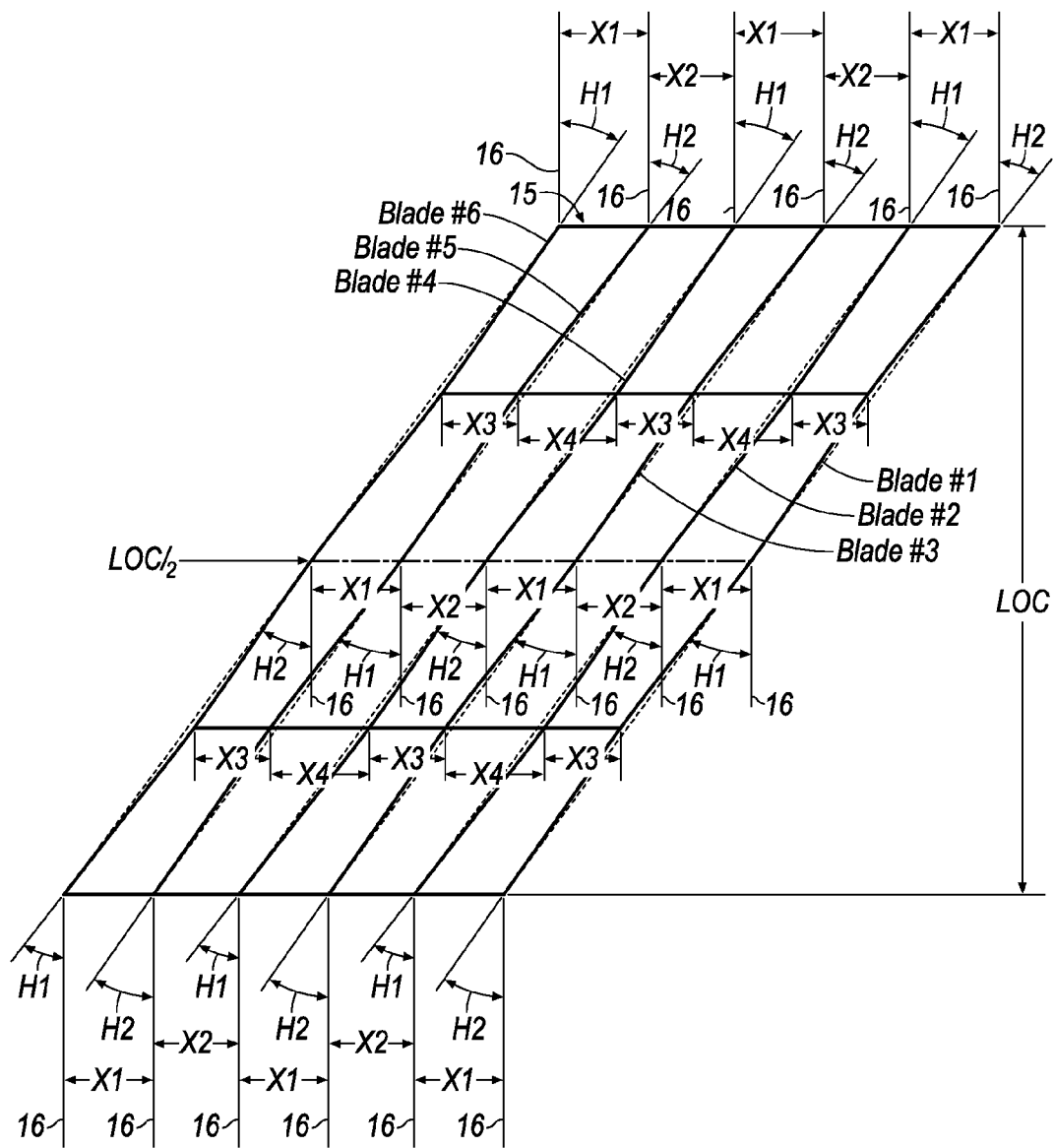
FIG. 6 is a schematic view of a six-fluted rotary cutting tool with alternating helix angles and varying helix angles along the length of cut (LOC) according to another embodiment of the invention.

It will be appreciated that the principles of the invention can be applied to any desirable manner in which the helix angle varies along the LOC. Referring now to FIG. 6, another embodiment of the cutting tool 10 is shown. In this embodiment, for example, the helix angle of blade #6 varies from a helix angle equal to H1 at the cutting tip 15 to same helix angle, H1, at the cutting portion 14 proximate the shank 12, unlike the embodiment shown in FIG. 5 in which the helix angle was equal to H1 at the cutting tip 15 to a different helix angle, H2, at the cutting portion 14 proximate the shank 12. Similar to the embodiment shown in FIG. 5, the variation of the helix angle of the embodiment shown in FIG. 6 is continuous varying along the length of cut (LOC) from the cutting tip 15 to the cutting portion 14 proximate the shank 12. However, the helix angle of blade #6 at LOC/2 is equal to H2 in the embodiment shown in FIG. 6, not equal to (H1+H2)/2 as in the embodiment shown in FIG. 5.

Oppositely, the helix angle of blade #5 continuously varies from a helix angle equal to H2 at the cutting tip 15 to same helix angle, H2, at the cutting portion 14 proximate the shank 12, and the helix angle of blade #5 at LOC/2 is equal to H1. Because the helix angle H1, H2 for adjacent blades 18 alternate, the helix angle of blade #4 at the cutting tip 15 is equal to H1 and equal to H2 at LOC/2, the helix angle of blade #3 at the cutting tip 15 is equal to H2 and equal to H1 at LOC/2, the helix angle of blade #2 at the cutting tip 15 is equal to H1 and equal to H2 at LOC/2, and the helix angle of blade #1 at the cutting tip 15 is equal to H2 and equal to H1 at LOC/2.

In addition, the distance between the cutting edge 28 of blade #6 and the cutting edge 28 of blade #5 is equal to X1 at the cutting tip 15, at LOC/2 and also equal to X1 at the opposite end of the cutting portion 14 proximate the shank 12. However, the distance between the cutting edge 28 of blade #6 and the cutting edge 28 of blade #5 is equal to X3, which is smaller than X1, at a location between the cutting tip 15 and LOC/2, and also equal to X3 at a location between LOC/2 and the cutting portion 14 proximate the shank 12. In the illustrated embodiment, this location is equal to LOC/4. However, it will be appreciated that the invention is not limited by the location being equal to LOC/4, and the location can be any desirable location between the cutting tip 15 and LOC/2. Similar to the helix angle, the distance between the cutting edges 28 of adjacent blades 18 in the embodiment shown in FIG. 6 is continuously varying along the LOC. The distance, X3, between the cutting tip 15 and LOC/2 continuously becomes larger to a distance of X1 at LOC/2, then continuously becomes smaller to a distance, X3, between LOC/2 and the cutting portion 14 proximate the shank 12, and then continuously becomes larger until to a distance, X1, at the cutting portion 14 proximate the shank 12.

Oppositely, the distance between the cutting edge 28 of blade #5 and the cutting edge 28 of blade #4 is equal to X2 at the cutting tip 15, at LOC/2 and also equal to X2 at the opposite end of the cutting portion 14 proximate the shank 12. However, the distance between the cutting edge 28 of blade #5 and the cutting edge 28 of blade #4 is equal to X4, which is larger than X2, at a location between the cutting tip 15 and LOC/2, and also equal to X4 at a location between LOC/2 and the cutting portion 14 proximate the shank 12. In the illustrated embodiment, this location is equal to LOC/4. However, it will be appreciated that the invention is not limited by the location being equal to LOC/4, and the location can be any desirable location between the cutting tip 15 and LOC/2. Similar to the helix angle, the distance between the cutting edges 28 of adjacent blades 18 in the embodiment shown in FIG. 6 is continuously varying along the LOC. The distance, X4, between the cutting tip 15 and LOC/2, then continuously becomes smaller to a distance of X2 at LOC/2, then continuously becomes larger to a distance, X4, at a location between LOC/2 and the cutting portion 14 proximate the shank 12, and then continuously becomes smaller until to a distance, X2, at the cutting portion 14 proximate the shank 12.

The distance between the cutting edge 28 of blade #4 and the cutting edge 28 of blade #3 and the distance between the cutting edge 28 of blade #2 and the cutting edge 28 of blade #1 behave in an identical manner as the distance between the cutting edge 28 of blade #6 and the cutting edge 28 of blade #5, and the distance between the cutting edge 28 of blade #3 and the cutting edge 28 of blade #2 behaves in an identical manner as the distance between the cutting edge 28 of blade #5 and the cutting edge 28 of blade #4.

In the illustrated embodiment, the distance, X4, is larger than the distance, X1, and X2, the distance, X1, is larger than the distance, X2, and the distance, X3, is smaller than X2. Thus, the distance, X3, is the smallest distance, while the distance, X4, is the largest distance. However, it will be appreciated that the invention can be practiced with any desirable relative distances X1, X2, X3 and X4 and the invention is not limited by the relative distances in the illustrated embodiment, so long as the relative distance between adjacent blades 18 is varying along the LOC.

The patents and publications referred to herein are hereby incorporated by reference.

Having described presently preferred embodiments the invention may be otherwise embodied within the scope of the appended claims.

What is claimed is:

1. A rotary cutting tool with a longitudinal axis, comprising:

a shank portion; and a cutting portion extending from the shank portion to a cutting tip, the cutting portion having a length of cut, and a plurality of blades separated by flutes extending along the length of cut, each of the blades including a cutting edge at an intersection between a leading face and a land surface, wherein a first blade of the plurality of blades forms a first helix angle with respect to the longitudinal axis at the cutting tip, and wherein a second blade of the plurality of blades adjacent the first blade forms a second, different helix angle with respect to the longitudinal axis at the cutting tip;

wherein the cutting edge of the first blade is formed at a first distance with respect to the cutting edge of the second blade at the cutting tip, and wherein the cutting edge of the second blade is formed at a second, different distance with respect to the cutting edge of a third blade at the cutting tip;

wherein a helix angle of at least one of the plurality of blades varies along the length of cut;

wherein the cutting edge of the first blade is formed at the first distance from the cutting edge of the second blade at the cutting portion proximate the shank; and wherein the cutting edge of the first blade is formed at the second distance with respect to the cutting edge of the second blade at a location between the cutting tip and the cutting portion adjacent the shank.

2. The rotary cutting tool according to claim 1, wherein the first blade is formed with the second helix angle at the cutting portion proximate the shank.

3. The rotary cutting tool according to claim 1, wherein the third blade is formed with the first helix angle at the cutting tip.

4. The rotary cutting tool according to claim 1, wherein the first helix angle is smaller than the second helix angle.

5. The rotary cutting tool according to claim 1, wherein the cutting edge of the first blade is formed at the second distance from the cutting edge of the second blade at a location equal to the length of cut (LOC)/2.

6. The rotary cutting tool according to claim 1, wherein the cutting edge of the first blade is formed at a third distance from the cutting edge of the second blade at a location between the cutting tip and the length of cut (LOC)/2.

7. The rotary cutting tool according to claim 1, wherein the cutting edge of the first blade is formed at a third distance from the cutting edge of the second blade at a location between the length of cut (LOC)/2 and the cutting portion proximate the shank.

8. The rotary cutting tool according to claim 1, wherein the cutting edge of the second blade is formed at the second distance from the cutting edge of the third blade at the cutting portion proximate the shank.

9. The rotary cutting tool according to claim 1, wherein the first blade is formed with the first helix angle at the cutting portion proximate the shank.

10. The rotary cutting tool according to claim 9, wherein the first blade is formed with the second helix angle at a location equal to the length of cut (LOC)/2.

11. The rotary cutting tool according to claim 9, wherein the second blade is formed with the second helix angle at the cutting portion proximate the shank.

12. The rotary cutting tool according to claim 11, wherein the second blade is formed with the first helix angle at a location equal to the length of cut (LOC)/2.

13. The rotary cutting tool according to claim 1, wherein the helix angle of the at least one of the blades continuously varies along the length of cut.

14. A rotary cutting tool with a longitudinal axis, comprising:
a shank portion; and
a cutting portion extending from the shank portion to a cutting tip, the cutting portion having a length of cut, and a plurality of blades separated by flutes extending along the length of cut, each of the blades including a cutting edge at an intersection between a leading face and a land surface,
wherein a first blade of the plurality of blades forms a first helix angle with respect to the longitudinal axis at the cutting tip, and wherein a second blade of the plurality of blades adjacent the first blade forms a second, different helix angle with respect to the longitudinal axis at the cutting tip;
wherein the cutting edge of the first blade is formed at a first distance with respect to the cutting edge of the second blade at the cutting tip, and wherein the cutting edge of the second blade is formed at a second, different distance with respect to the cutting edge of a third blade at the cutting tip; and
wherein the cutting edge of the first blade is formed at the second distance with respect to the cutting edge of the second blade at a location between the cutting tip and the cutting portion proximate the shank.

15. The rotary cutting tool according to claim 14, wherein a helix angle of the first blade varies along the length of cut.

16. The rotary cutting tool according to claim 14, wherein the first blade is formed with the second helix angle at the cutting portion proximate the shank.

17. The rotary cutting tool according to claim 14, wherein the first helix angle is smaller than the second helix angle.

18. The rotary cutting tool according to claim 14, wherein the location is equal to the length of cut (LOC)/2.

19. A rotary cutting tool with a longitudinal axis, comprising:
a shank portion; and
a cutting portion extending from the shank portion to a cutting tip, the cutting portion having a length of cut, and a plurality of blades separated by flutes extending along the length of cut, each of the blades including a cutting edge at an intersection between a leading face and a land surface,
wherein a first blade of the plurality of blades forms a first helix angle with respect to the longitudinal axis at the cutting tip, and wherein a second blade of the plurality of blades adjacent the first blade forms a second, different helix angle with respect to the longitudinal axis at the cutting tip;
wherein the cutting edge of the first blade is formed at a first distance with respect to the cutting edge of the second blade at the cutting tip, and wherein the cutting edge of the second blade is formed at a second, different distance with respect to the cutting edge of a third blade at the cutting tip;
wherein a helix angle of the first blade varies along the length of cut; and
wherein the cutting edge of the first blade is formed at the first distance from the cutting edge of the second blade at the cutting portion proximate the shank.

* * * * *